Jan. 11, 1955  B. E. CALDWELL  2,699,188
OFF BEARING FRAME FOR POWER SAW UNITS
Filed Sept. 23, 1953
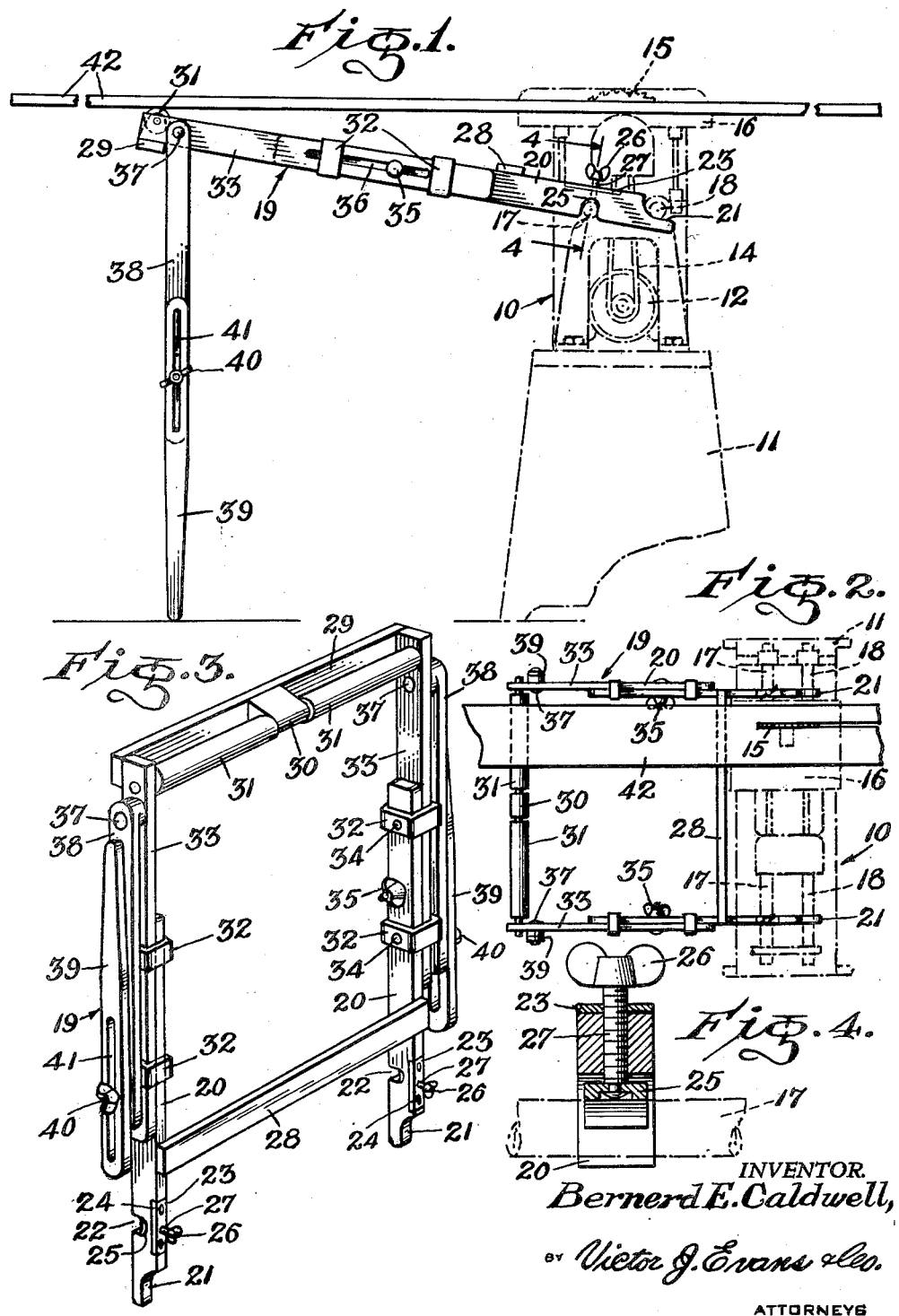
INVENTOR.
Bernerd E. Caldwell,
by Victor J. Evans &Co.
ATTORNEYS

United States Patent Office 2,699,188
Patented Jan. 11, 1955

2,699,188

OFF BEARING FRAME FOR POWER SAW UNITS

Bernerd E. Caldwell, Shelton, Wash.

Application September 23, 1953, Serial No. 381,854

2 Claims. (Cl. 143—132)

This invention relates to an off bearing frame for table type power saws, and more particularly to a detachable off bearing frame for use on table type power saws mounted on tubular or cylindrical ways such as a Shopsmith machine.

In ripping long pieces of lumber or sawing relatively large sheets of plywood, wallboard or Masonite such as are commonly supplied in the trade in the form of four foot by eight foot sheets on the usual table type power saw, there has been a long felt need for a quickly attachable temporary off bearing frame which would enable a single operator to perform such sawing operations accurately and without assistance. Several methods have been devised in the past for accomplishing this object, but all such previous methods have been inconvenient, hazardous, cumbersome and difficult.

Therefore, it is among the objects of this invention to provide a simple, light off bearing frame which can be easily attached to or detached from the ways of the usual power saw mounted on tubular or cylindrical ways such as the Shopsmith machine, by a single operator in a matter of seconds only without the use of any tools whatever.

Another object of the invention is to provide a simple light off bearing frame which can be instantly, easily and accurately adjusted to conform to the position of the permanent saw table, the present invention being also easily and rapidly adjusted to conform to any unevenness in the floor upon which the saw machine and off bearing frame may be placed, and wherein a single operator will be able to handle and ripsaw relatively long pieces of lumber or large sheets of material such as plywood, wallboard, and the like without assistance.

A still further object of the invention is to provide a simple, light off bearing frame which upon being detached from the saw machine can be easily and quickly folded up in a compact form for storage as by hanging up on the shop wall.

A further object of the invention is to provide an off bearing frame which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the frame being used.

Figure 2 is a top plan view showing the frame in use.

Figure 3 is a perspective view showing the frame in folded position.

Figure 4 is a sectional view taken on the line 4—4 of Figure 1.

Referring in detail to the drawings the numeral 10 designates a conventional power saw unit which may be a Shopsmith unit. The saw unit 10 includes a base 11 which supports a motor 12 that may be connected to a suitable source of electrical energy. A belt and pulley means 14 connects the motor 12 to the usual saw blade 15, Figure 1, and a platform 16 is arranged above the base 11, Figures 1 and 2. The conventional power saw unit further includes tubular ways 17 and 18, and the present invention is directed to an off bearing frame 19 which is adapted to be used with the Shopsmith power saw unit or other type of saw. The frame 19 includes a pair of side sections which are arranged in spaced parallel relation with respect to each other, and each of the side sections includes a leg 20 which is provided with a cutout 21 adjacent one end thereof for engagement with the tubular ways 18. A recess or cutout 22 is also provided in each of the bars or arms 20, Figures 3 and 4. Secured to each of the arms 20 adjacent the cutout 21 is a plate 23, the plate 23 being secured in place by suitable securing elements such as screws 24. A bolt 27 having threads thereon extends through each of the plates 23 and into the cutout 22. An arcuate adjustable shoe 25 is secured to the inner end of each of the bolts 27, and the shoes 25 are adapted to engage the tubular ways 17. A suitable wing nut 26 or other gripping member can be mounted on the outer end of each of the bolts 27 for use in turning the bolts 27 so as to adjust the position of the shoes 25.

Secured to each of the arms 20 is a plurality of rectangular brackets 32, the brackets 32 being secured to the arms 20 by suitable securing elements 34. A finger 33 is arranged contiguous to each of the arms 20, and the fingers 33 are slidably positioned in the brackets 32. A brace 28 interconnects the arms 20 together, and a bar 29 interconnects the ends of the fingers 33 together. A bearing 30 is secured to the bar 29, and a pair of rollers 31 are journaled between the bearing 30 and the fingers 33. A means is provided for maintaining the fingers 33 immobile in their various extended or adjusted positions, and this means comprises bolt and nut assemblies 35 which extend through the arms 20 and through suitable slots 36 in the fingers 33. Thus, by loosening the bolt and nut assemblies 35 the length of the side sections can be varied.

A pin 37 pivotally connects a link 38 to each of the fingers 33, and a leg 39 is pivotally and slidably connected to each of the links 38. Each of the legs 39 is provided with an elongated slot 41 through which extends a bolt and nut assembly 40, the bolt and nut assembly 40 also extending through the adjacent link 38. The numeral 42 designates a piece of wood or other work that is being cut.

From the foregoing it is apparent that an off bearing frame has been provided for use with a Shopsmith power saw unit or other type of saw unit. In use the frame 19 is connected to the saw as shown in Figure 1. Thus, as shown in Figure 1 the cutouts 21 in the arms 20 engage under the tubular ways 18, while the cutouts 25 receive therein the tubular ways 17. Then by loosening the bolt and nut assemblies 35 the fingers 33 can be extended to the desired length. When heavy weights are being supported, the legs 39 can be used as shown in Figure 1, and by loosening the bolt and nut assemblies 40 the legs 39 can be extended to the desired elevation or length. When the frame is not being used it can be readily removed from the power unit, and then these parts can be folded to occupy a compact unit as shown in Figure 3 so that it can be hung from the wall or placed in any other suitable location.

The present invention can be used to handle large pieces of veneer, fiberboard, or other work pieces 42 when the pieces are being cut on a Shopsmith power saw and wherein such pieces would otherwise be impossible to handle without the help of another person. By means of the cutouts 22 and 21 the frame is locked to the tubular ways 17 and 18 so that the frame will not shove away when pressure is exerted against the rolls 31. Also, the frame can be shifted to the left or right to line up with different widths that are being cut, and the legs of the frame are adjustable so that it can be adjusted to various floor levels. Also, these legs 39 and 38 carry part of the weight of heavy material thereby eliminating the possibility of tipping the Shopsmith over; regardless of the way the Shopsmith is tilted due to rough floor or uneven ground the frame is always in line with the saw. When not in use the frame 19 can be folded up as shown in Figure 3 and hung on a wall which will not take up very much space. Also, the frame can be put on in a very short period of time and detached quickly and by providing the plurality of rolls 31, one piece of wood can be held still while the other piece is pulled back and forth to thereby prevent the pieces from falling on the floor. The frame of the present invention will handle or support long pieces of material easily without the help of anyone except the operator.

The frame can be made of other material besides wood, as for example the frame may be made of metal. If made of metal, the frame can be made of nesting channel shaped members of a suitable light metal. It is to be understood that the frame is applicable to any power saw unit supported on horizontal tubular cylindrical or similar type ways of which the Shopsmith unit is one good example, but the present invention is not limited solely to Shopsmith machines, as there are other similar machines on the market with which the frame can be used. The shoes 25 are attached to the threaded bolts 27 so that the height of the shoes can be adjusted, and the purpose of this adjustment is to enable the operator to change the angle of the frame slightly and thereby align the rollers 31 with the saw cutting table whenever it becomes necessary to lengthen the frame to accommodate extra long material. If the frame is made of metal, the sides can be made of telescoping U-channels. By having two or more rollers 31, when there is only a single operator he can leave one of the pieces lying on the frame and roller while taking care of the other after making a cut and when handling large pieces of material this feature is very important. In handling light material the legs are quite often not necessary but when handling heavy sheets of plywood they are a necessity.

I claim:

1. In an off bearing frame for power saw units, a pair of spaced parallel extensible side sections, each of said side sections including an arm provided with a cutout adjacent one end, a plate secured to said arm adjacent said cutout, there being a recess in each of said arms, an adjustable curved shoe movably mounted in said recess, a securing element extending through said plate and connected to said shoe, a pair of brackets connected to each of said arms, a finger slidably positioned in said brackets and arranged contiguous to each of said arms, securing elements adjustably connecting said fingers to said arms, a bar extending between said pair of fingers and secured thereto, a bearing connected to said bar, a pair of rollers arranged in end to end relation with respect to each other and connected to said bearing and to said fingers, a link pivotally connected to each of said fingers, a leg arranged contiguous to each of said links and provided with an elongated slot, and securing elements extending through the slots in said legs and through said links.

2. In an off bearing frame for power saw units, a pair of extensible side sections, each of said side sections including an arm provided with a cutout, a plate secured to said arm adjacent said cutout, there being a recess in each of said arms, an adjustable shoe movably mounted in said recess, a securing element extending through said plate and connected to said shoe, a pair of brackets connected to each of said arms, a finger slidably positioned in said brackets, securing elements adjustably connecting said fingers to said arms, a bar extending between said pair of fingers and secured thereto, a bearing connected to said bar, a pair of rollers connected to said bearing and to said fingers, a link pivotally connected to each of said fingers, a leg arranged contiguous to each of said links and provided with an elongated slot, and securing elements extending through the slots in said legs and through said links.

References Cited in the file of this patent

UNITED STATES PATENTS

| | | |
|---|---|---|
| 103,347 | Lepp | May 24, 1870 |
| 746,972 | Marsh | Dec. 15, 1903 |
| 1,104,735 | Morris | July 21, 1914 |
| 2,555,217 | Young | May 29, 1951 |